United States Patent
Owens

(10) Patent No.: US 6,210,619 B1
(45) Date of Patent: Apr. 3, 2001

(54) METHOD FOR MANUFACTURING A TWO-PIECE PLASTIC ASSEMBLY

(75) Inventor: Dale Douglas Owens, Bellevue, OH (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/174,611

(22) Filed: Oct. 19, 1998

(51) Int. Cl.[7] .................................................. B29C 45/14
(52) U.S. Cl. .......................... 264/255; 264/263; 264/267; 264/297.2; 264/297.8
(58) Field of Search .................................... 264/250, 255, 264/261, 263, 297.1, 297.2, 297.8, 248, 267

(56) References Cited

U.S. PATENT DOCUMENTS

| | | | |
|---|---|---|---|
| 3,287,485 | * 11/1966 | McCord | 264/263 |
| 4,155,478 | * 5/1979 | Ogi | 264/263 |
| 4,261,947 | * 4/1981 | Ogi | 264/248 |
| 5,008,060 | * 4/1991 | Kanai et al. | 264/255 |
| 5,116,557 | * 5/1992 | Debaes et al. | 264/255 |
| 5,413,743 | 5/1995 | Prophet | 264/255 |
| 5,603,792 | * 2/1997 | Guala et al. | 156/245 |
| 5,626,413 | * 5/1997 | Ferrell | 362/61 |
| 5,885,499 | * 3/1999 | Aksberg | 264/250 |
| 6,042,364 | * 3/2000 | Nishida | 264/255 |

* cited by examiner

*Primary Examiner*—Angela Ortiz
(74) *Attorney, Agent, or Firm*—MacMillan, Sobanski & Todd, LLC

(57) ABSTRACT

A method of molding articles includes providing a first mold having a first lens cavity surface, a reflector core surface and a second lens cavity surface. A second mold has a first lens core surface, a first reflector cavity surface, a second reflector cavity surface, and a second lens core surface. A first position is established to form a first article cavity and a second article cavity and a first joining cavity. A second position is established to form a second joining cavity, a third article cavity, and a fourth article cavity. A plastic material is placed into the first article cavity to form a lens. A plastic material is placed into the second article cavity to form a reflector. The first mold and the second mold are arranged in the first position to form the lens and the reflector. The first mold and the second mold are arranged in the second position to form the lens and the reflector. The first mold and the second mold are shuttled between the first position and the second position.

5 Claims, 4 Drawing Sheets

METHOD FOR MANUFACTURING A TWO-PIECE PLASTIC ASSEMBLY

BACKGROUND OF THE INVENTION

1. Field of the invention

The present invention is directed to a method and apparatus for injection molding a two-piece plastic assembly. More specifically, the present invention is directed to a method and apparatus that utilizes a linearly moving shuttle mold to simultaneously mold and join a plastic assembly.

2. Description of the Related Arts

U.S. Pat. No. 5,413,743, teaches a method of manufacturing a two-piece headlamp assembly using a rotary platen. The rotary platen utilizes at least two die sets (two pair of matched molds) to form a plastic article. A first die set is used to manufacture a transparent lens. A second die set is used to manufacture a reflector that mates with the lens. The lens is injection molded at a first location on the rotary platen. The reflector portion is molded at a second location on the rotary platen at the same time as the lens. The reflector and lens die sets are opened and the die portion containing the lens is mated with the die portion containing the reflector in a third location on the rotary platen. When the lens and reflector are brought together, they form a cavity. A plastic material is injected into this cavity to join the lens and reflector.

The invention described in U.S. Pat. No. 5,413,743 utilizes at a minimum two separate die sets (four dies) requiring movement between their molding position and their joining position. This movement is achieved through a rotary table.

It is desirable to utilize an injection molding apparatus that may injection mold the two plastic components and then join the components using a single die set. It is further desirable that a single injection molding press be used to mold the components and then create a joining bond therebetween. It is also desirable that each cycle of the molding apparatus both mold the components and create a joining bond between a previously molded pair of plastic components.

SUMMARY OF THE INVENTION

The present invention is directed to a method and apparatus for manufacturing a two-piece plastic assembly from a single die set comprising a series of steps. A molding apparatus having a first mold moveable between first and second positions and a second mold is utilized for manufacturing the plastic articles. The first mold has a first surface and a second surface. The second mold has a third surface and a fourth surface. The apparatus moves the first mold to the first position and then closes. The apparatus brings the first and second molds together causing the first and third mold surfaces to define a first article cavity and the second and fourth mold surfaces to define a second article cavity. A molten first plastic material is injected into the first article cavity. A second plastic material is injected into the second article cavity. After the first and second materials have cooled, they form a first and second article respectively. The apparatus is opened and the first mold is moved to a second position. The apparatus is closed and the first mold positions the first article juxtaposed to the second article and forms a joining cavity therebetween. A third plastic material is injected into the joining cavity and joins the first and second article to form the plastic assembly.

The invention may optionally include additional mold surfaces so that a second pair of first and second articles may be formed while a first pair of first and second articles are joined. These additional surfaces will receive molten plastic material to form another pair of first and second articles while the first pair of first and second articles are joined together.

The invention may be practiced using a linearly moving shuttle mold. The shuttle mold includes a stationary mold and a mold linearly moveable along a line perpendicular to the mold closing movement. The shuttle mold enables a single die set to be able to mold the first and second articles and retain the molded articles within the die set as the first mold is moved between a first and second position. The first and second articles are brought together and joined when the first mold is moved to the second position. The present invention enabled the molding and joining of the two-piece assembly using a single injection molding apparatus and a single pair of opposed molds (die sets). A completed molded article is produced with each cycling of the molding apparatus.

These and other objects, features, and advantages of the present invention will become more readily apparent when viewed in connection with the accompanying drawings wherein like reference numerals correspond to like components.

DETAILED DESCRIPTION OF THE PREFERRED EMBODIMENTS

Figure 1:
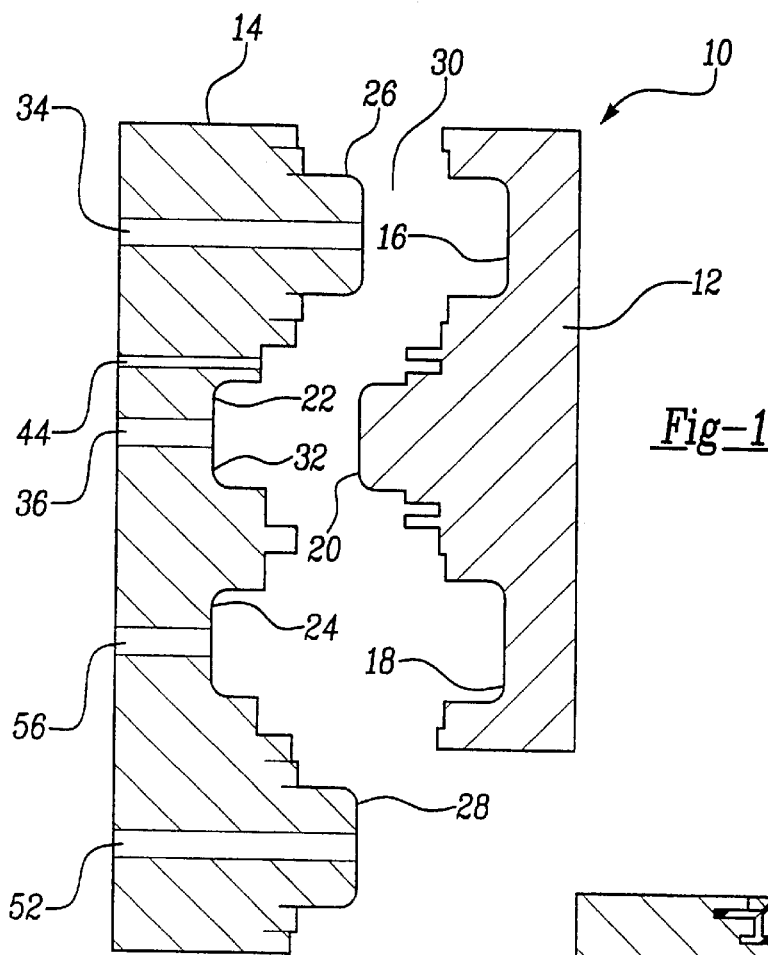
FIG. 1 is a cross-sectional view of a shuttle mold in the open first position.

The present invention will be described through a series of drawings, which illustrate a manufacture of an automotive lens and reflector and the joining thereof. The invention maybe used to form and join together any type of plastic components. The invention also illustrates a shuttle molding apparatus having two pair of forming surfaces however a molding apparatus having single pair of forming surfaces is also useful for the invention.

Reproduced below is a word list of the items described in the drawings that is useful in understanding the invention:

10 molding apparatus
12, 14 molds
16, 18 lens cavity surfaces
20 reflector core surface
22, 24 reflector cavity surfaces
26, 28 lens core surfaces 30 first article cavity
32 second article cavity
34, 36 resin inlet
38 lens
40 reflector
42 joining cavity
44 resin inlet
46 lamp assembly
48 third article cavity
50 fourth article cavity
52 resin inlet
54 second lens
56 resin inlet
58 second reflector
60 guides Referring to FIG. 1 of the drawings, there is shown a schematic diagram illustrating the various manufacturing steps of the present invention. A shuttle molding apparatus 10 is used to manufacture a lens and reflector assembly. The injection molding press and associated equipment have not been shown for clarity. The assembly 10 includes a pair of opposed molds 12, 14. The words molds and molding dies are sometimes called dies or die sets. The mold 12 has two cavity surfaces 16, 18 and a core surface 20. The mold 14 has two cavity surfaces 22, 24 and two core surfaces 26, 28.

Figure 2:
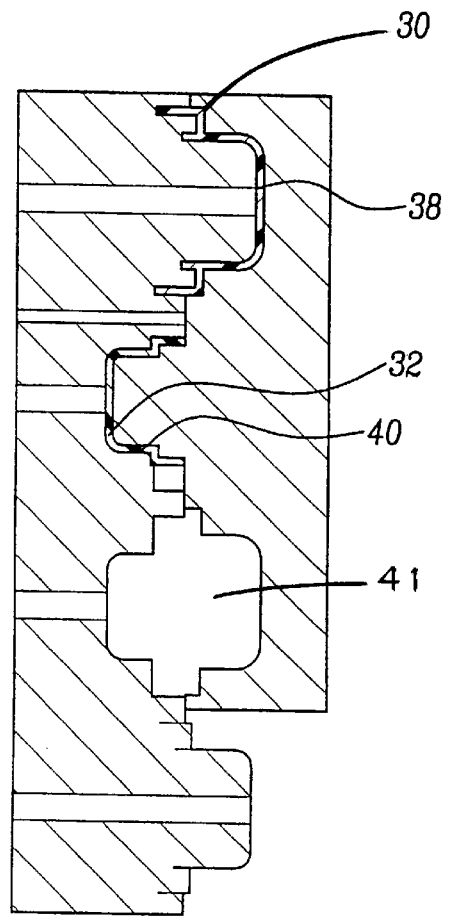
FIG. 2 is a cross-sectional view of the mold illustrated in FIG. 1 in the closed first position.

The molds 12, 14 are operable between open and closed position as shown in FIGS. 1 and 2. The mold 14 is generally moved towards the mold 12 to close the molds. The cavity surface 16 and the core surface 26 mate to form a first article cavity 30 therebetween when the molds 12, 14 are moved to the closed first position as shown in FIG. 2. The cavity surface 22 and the core surface 20 mate to form a second article cavity 32. The second lens cavity surface 18 and the second reflector cavity surface 24 are aligned to form a first joining cavity 41. Illustrated is an automotive lens made in the first article cavity 30 and a mating reflector made in the second article cavity 32. A clear molten plastic material is injected into the first article cavity 30 through a resin inlet 34. An opaque molten plastic material is injected into the second article cavity 32 through a resin inlet 36. The clear and opaque plastic material may be injected sequentially or simultaneously. The clear plastic material solidifies to form a lens 38 and the opaque plastic material solidifies to form a reflector 40.

Figure 3:
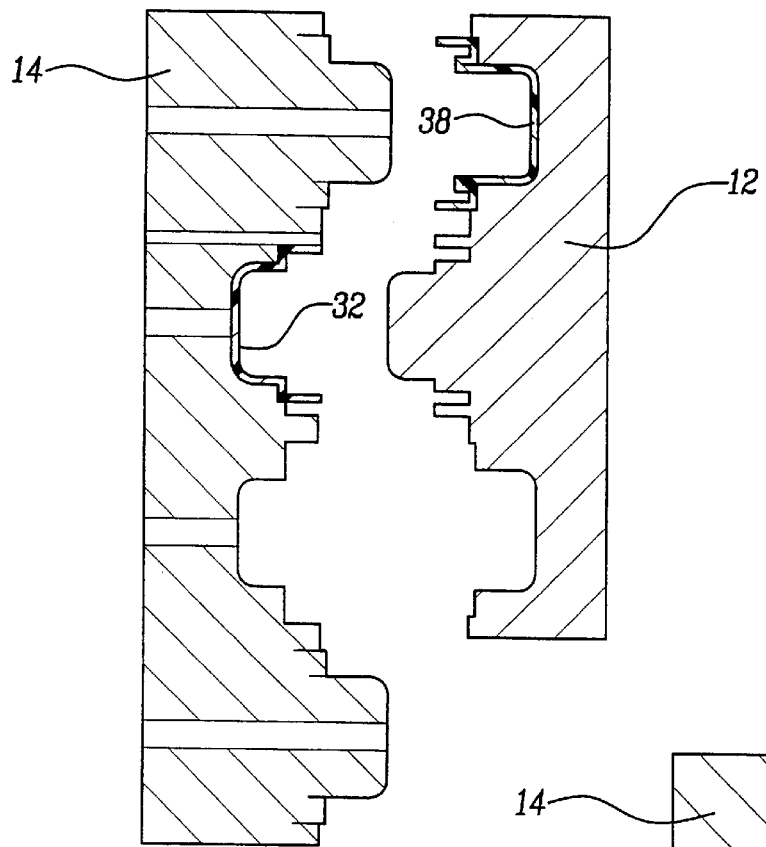
FIG. 3 is a cross-sectional view of the mold illustrated in FIG. 1 in the open first position with the lens and reflector on the molds.
Figure 4:
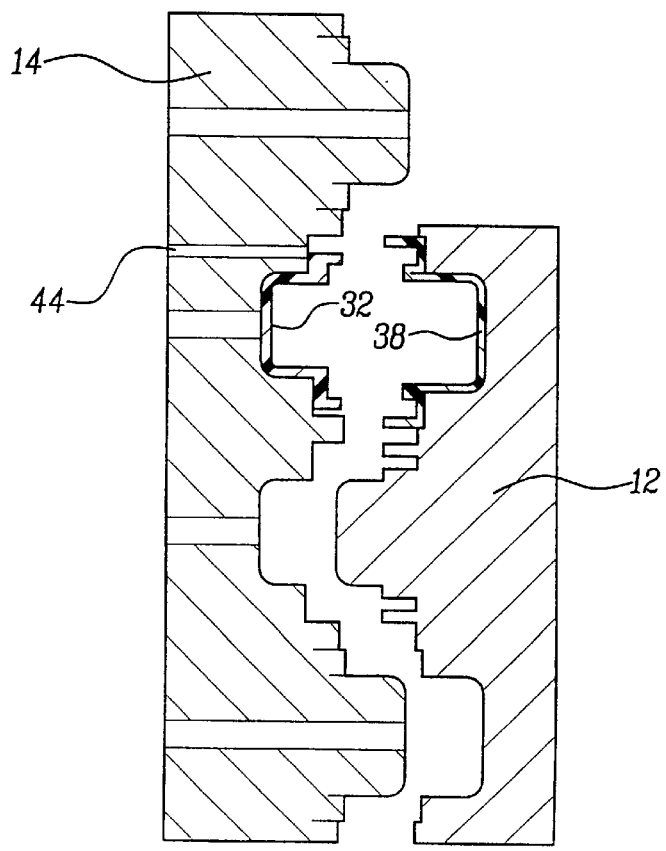
FIG. 4 is a cross-sectional view of the mold illustrated in FIG. 1 in the open second position.

The molds 12, 14 are then moved to the open position as shown in FIG. 3. The lens 38 is retained on the cavity surface 16 and the reflector 40 is retained on the cavity surface 22. The shape of the article and the mold surfaces provide sufficient retention to enable to the molded articles to be repeatably retained on the cavity surfaces. The mold 12 is then moved (shuttled) to the second position as shown in FIG. 4. The shuttle movement is generally linear in a plan perpendicular to the open and close axis of the molds 12, 14. The mold 14 may be moved by a mechanical, electric, hydraulic or pneumatic means. Hydraulic actuators are most common among injection molding machines.

Figure 5:
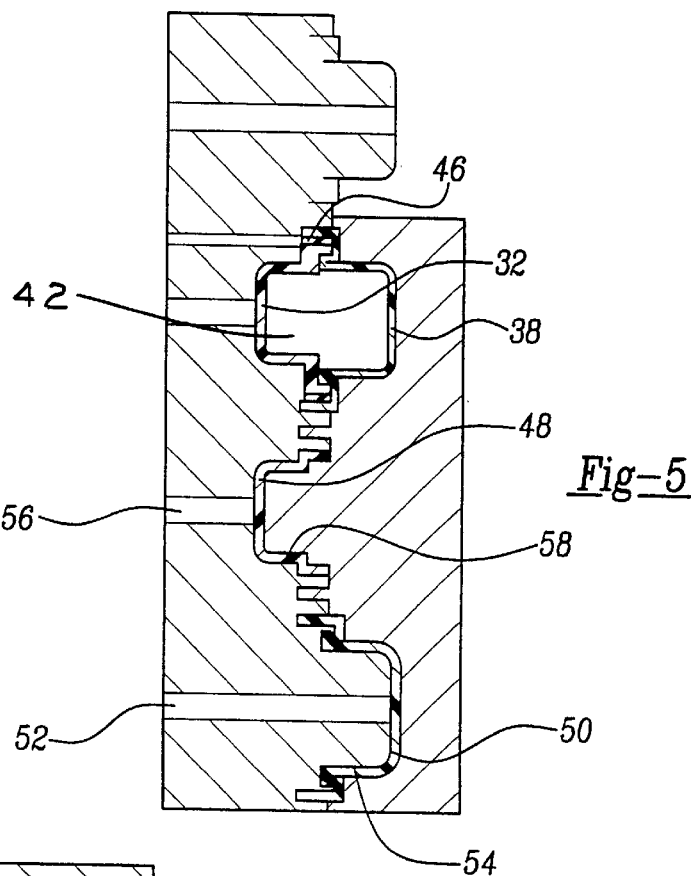
FIG. 5 is a cross-sectional view of the mold illustrated in FIG. 1 in the closed second position and showing a joining material injected between the lens and reflector and molding another lens and reflector pair.
Figure 6:
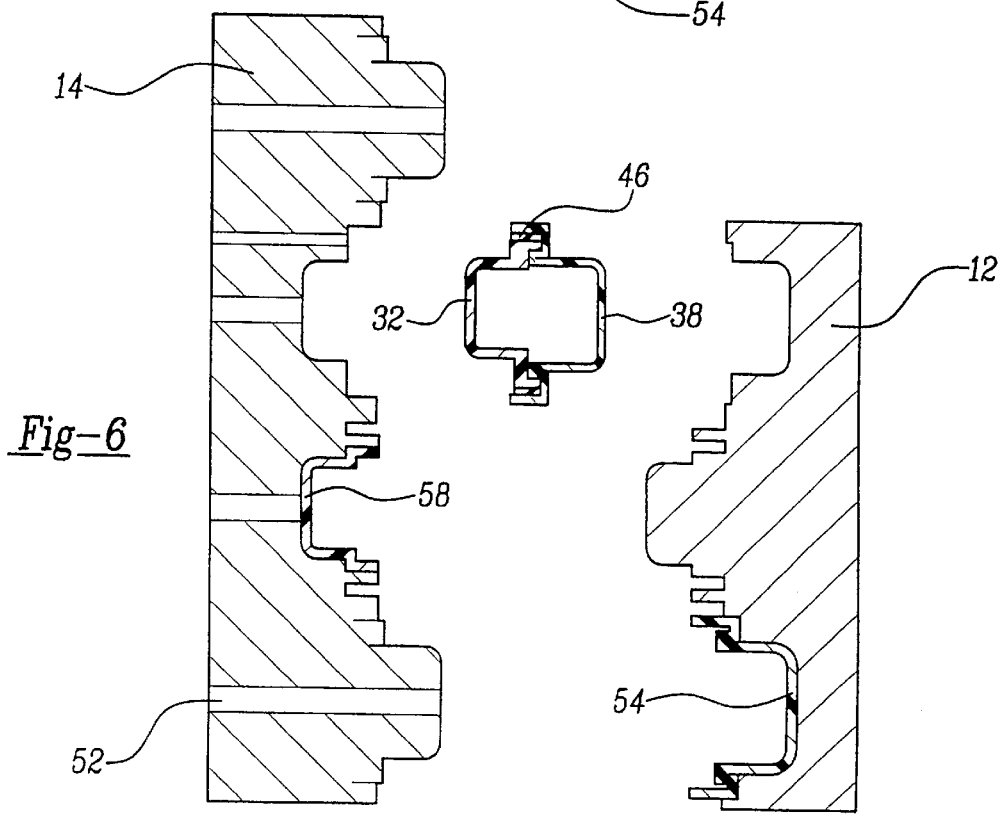
FIG. 6 is a cross-sectional view of the mold illustrated in FIG. 1 removing the completed lamp assembly and preparing to join another lens and reflector.

The molds 12, 14 are then brought together as shown in FIG. 5. The lens 38 mates with the reflector 40 to create a joining cavity 42 therebetween. The joining cavity is a space generally bounded by a peripheral portion of the lens 38 and reflector 40 and the mold 12. The lens 38 and reflector 40 are joined by a molten plastic material injected through a resin inlet 44. The plastic material injected through the resin inlet 44 is compatible with the clear and opaque plastic materials. The plastic fuses between the lens 38 and reflector 40 to join the articles into a lamp assembly 46.

The method optionally includes the step of forming a second lens and reflector pair during the joining step. The mold 12 includes third article cavity 48 between the reflector core surface 20 and the reflector cavity surface 24 and a fourth article cavity 50 between the lens core surface 28 and the lens cavity surface 18 when the mold 14 is moved to the closed second position. The clear plastic material is injected through resin inlet 52 to form a second lens 54. The opaque plastic material is injected through resin inlet 56 to form a second reflector 58. The second lens and reflector 54, 58 are produced during the joining step.

The mold 14 is moved to an open position and the finished lamp assembly 46 is removed from the molds 12, 14. An ejector (not shown) may be used to assist in removing the lamp assembly 46. The second lens 54 and the second reflector 58 remain in the molds 12, 14 as shown and are joined when the mold 14 is moved to the closed first position. In this fashion, each cycle of the molding operation may simultaneously form a first lens and reflector pair and join a second lens and reflector pair.

Figure 7:
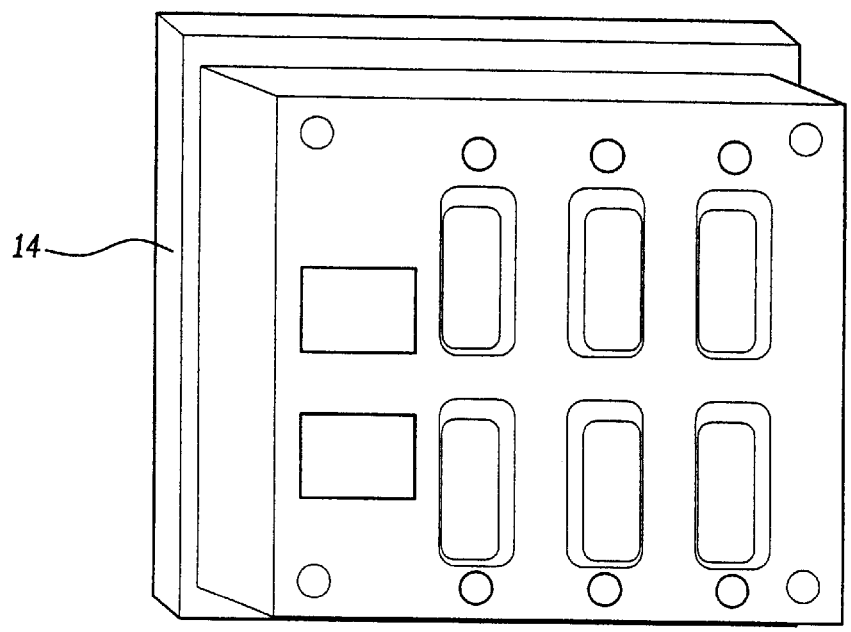
FIG. 7 is a plan view of the stationary mold.
Figure 8:
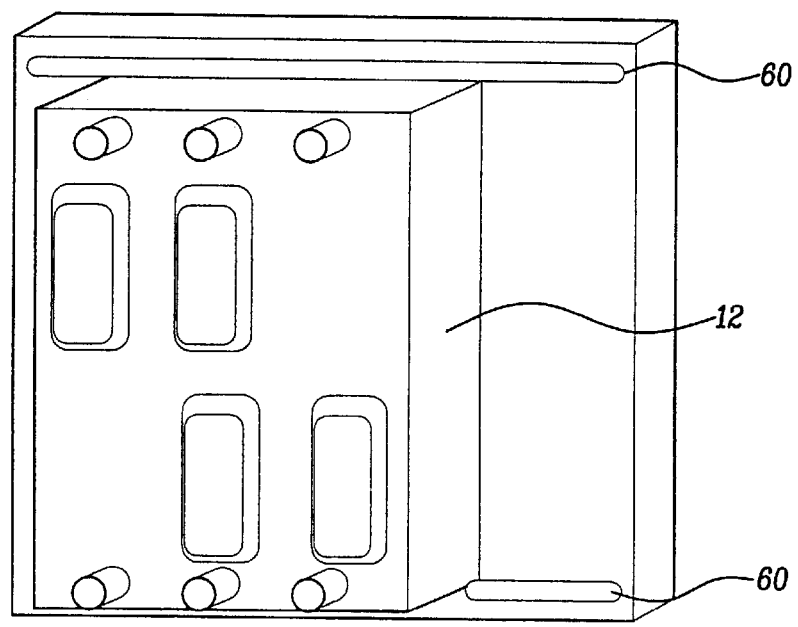
FIG. 8 is a plan view of the movable shuttle mold.

Illustrated in FIG. 7 is the stationary mold 14. The mold 14 molds both the left and right lens and reflector members. Illustrated in FIG. 8 is the movable shuttle mold 12 in the first position. The mold 12 moves along the guides 60. The movable shuttle mold 12 includes means (not shown) for ejecting the molded article from the mold 12.

The invention has been described as a method and apparatus of manufacturing an automotive lens and reflector assembly using the drawings and description provided. However, any plastic components that are molded and joined may by manufactured by the method and apparatus described. While the invention has been described using different types of plastic material, the same or different plastic materials may be used at any part of the molding process. Additional, various adaptations or modifications to the method and apparatus may be made without departing from the spirit and scope of the following claims.

What is claimed:

1. A method of molding articles for a two-piece plastic assembly comprising the following steps:

providing a first mold having a first lens cavity surface, a reflector core surface and a second lens cavity surface, wherein the reflector core surface is located between the first lens cavity surface and the second lens cavity surface;

providing a second mold, having a first lens core surface, a first reflector cavity surface, a second reflector cavity surface, and a second lens core surface, wherein the first reflector cavity surface is located between the first lens core surface and the second reflector cavity surface, and wherein the second reflector cavity surface is located between the first reflector cavity surface and the second lens core surface;

establishing a first position wherein the first lens cavity surface and the first lens core surface are aligned to form a first article cavity, and wherein the reflector core surface is aligned with the first reflector cavity surface to form a second article cavity, and the second lens cavity surface and the second reflector cavity surface are aligned to form a first joining cavity;

establishing a second position wherein the first lens cavity surface and the first reflector cavity surface are aligned to form a second joining cavity, the reflector core surface and the second reflector cavity surface are aligned to form a third article cavity, and the second lens cavity surface and the second lens core surface are aligned to form a fourth article cavity;

arranging the first mold and the second mold in the first position and placing the plastic material into the first article cavity and molding the plastic material to form the lens, and placing the plastic material into the second article cavity and molding the plastic material to form the reflector;

arranging the first mold and the second mold in the second position and placing the plastic material into the third article cavity and molding the plastic material to form the lens, and placing the plastic material into the fourth article cavity and molding the plastic material to form the reflector; and shuttling the first mold and the second mold between the first position and the second position, wherein when the first mold and the second mold are in the first position, the plastic material is placed into the first article cavity and molded to form the lens, and the plastic material is placed into the second article cavity and molded to form the reflector, and wherein when the first mold and the second mold are in the second position the plastic material is placed into the third article cavity and molded to form the lens, and the plastic material is placed into the fourth article cavity and molded to form the reflector.

2. The method of claim 1 wherein the lens and the reflector are joined together to form the two-piece plastic assembly when the first mold and the second mold are located in the first position.

3. The method of claim 2 wherein a resin is applied to the lens and the reflector to form the two-piece plastic assembly.

4. The method of claim 1 wherein the shuttling between the first position and the second position includes opening and closing the first mold and the second mold and removing the two-piece plastic assembly.

5. The method of claim 1 wherein the shuttling between the first position and the second position includes the lens remaining in the first article cavity and the reflector remaining in the second article cavity.

* * * * *